June 27, 1961  C. W. OSMOND ET AL  2,989,993
CHARGING DEVICE FOR PRESSURIZED CONTAINERS
Filed Jan. 9, 1958  6 Sheets-Sheet 1

INVENTORS.
CHARLES W. OSMOND,
PAUL R. FECHHEIMER
AND ROBERT W. KINNEY,
BY Allen & Allen
ATTORNEYS.

June 27, 1961  C. W. OSMOND ET AL  2,989,993
CHARGING DEVICE FOR PRESSURIZED CONTAINERS
Filed Jan. 9, 1958  6 Sheets-Sheet 6

United States Patent Office 2,989,993
Patented June 27, 1961

2,989,993
CHARGING DEVICE FOR PRESSURIZED CONTAINERS

Charles W. Osmond, Anderson Township, Hamilton County, and Paul R. Fechheimer and Robert W. Kinney, Cincinnati, Ohio, assignors to The Karl Kiefer Machine Company, Cincinnati, Ohio, a corporation of Ohio
Filed Jan. 9, 1958, Ser. No. 708,033
19 Claims. (Cl. 141—20)

Our invention relates to filling machines and more particularly to a charging device for pressurized containers wherein a propellant gas, such as Freon, is employed to dispense the contents of the container.

In filling these so called "aerosol" or pressurized containers, the material to be dispensed is generally introduced into the container through a relatively wide mouth at the top of the container, whereupon the mouth is closed by a cap or cover which carries the valve mechanism by means of which the material is dispensed. Thereafter, the container is charged with the propelling agent which is usually introduced into the container through the dispensing valve. Considerable difficulty has been encountered in charging such containers by reason of the difficulty experienced in handling the propelling agents. For the most part such agents are in the form of liquefied gas which will boil at fairly low temperature, such as ordinary room temperature, so that it will develop the desired vapor pressure or propelling force in the container under normal conditions of use. The nature of such gases makes them very difficult to handle in that conventional container gassing equipment will not accurately meter such liquefied gases. In particular, an aerosol gas, such as dichlorodifluoromethane, is subject to vapor pressure change as it enters a container being charged. This change in vapor pressure is by reason of the expansion of the gas as it enters the container, the expanding gas acting to cool the container and its contents with a resulting change in the pressure of the gas. We have found that the change in vapor pressure varies from can to can and, where conventional pressure filling techniques and equipment are employed, i.e. as where the mechanism charges to a predetermined line pressure, considerable variation in charge results from container to container. In addition to this inaccuracy in filling, the valving arrangement in conventional gassing equipment does not effect the necessary instantaneous shutoff of flow required where propellant gases are being handled.

In accordance with the instant invention, we provide an improved charging mechanism by means of which the difficulties enumerated above are overcome. To this end we have provided a device by means of which a predetermined measured increment of propellant gas is accurately injected into each container, the mechanism including a charging head incorporating valve mechanism which is instantaneously responsive to both start and stop the charging operation.

A principal object of our invention is the provision of a charging device by means of which a predetermined quantity of liquefied propellant gas is accumulated in the charging head for subsequent discharge into a container upon presentation thereto.

A further object of our invention is the provision of a charging device incorporating automatically acting control means for said charging device effective, upon the delivery of a container to the device, to move the device through its operating cycle.

A further object of our invention is the provision of a charging mechanism of the character described wherein the charging heads are arranged for continuous charging in a straight line operation.

A futher object of our invention is the provision of a multiple station charging device provided with a dual container feeding and conveying arrangement by means of which a continuous supply of containers may be charged in a straight line operation.

Still a further object of our invention is the provision of container shifting means capable of simultaneously moving a plurality of aligned containers or similar articles from a first location to a second location spaced laterally from the first.

The foregoing together with other objects of our invention which will appear heerinafter or which will be apparent to the skilled worker in the art upon these specifications, we accomplish by those constructions and arrangements of parts of which we shall now describe certain exemplary embodiments.

Reference is now made to the accompanying drawings wherein.

Referring first to FIGURES 1 through 9 of the drawings, we have therein illustrated a two spout charging device in which the containers to be charged are manually presented to the machine. In this embodiment of the invention, the entire device may be conveniently mounted on a vertically disposed supporting column 1 adjustably mounted on a suitable base or standard 2. The vertical column adjustably mounts a table 3 carrying lift platforms 4 arranged to be raised and lowered relative to the table by means of air cylinders 5 which may be actuated by a source of air under pressure (not shown). It will be understood, of course, that other forms of fluid actuated cylinders may be employed in place of the pneumatic cylinders.

A charging head 6 overlies each of the lifting platforms, the heads being secured to supporting column 1 by means of an adjustable mounting bracket 7 slidable along the column.

The table 3 mounts a container guide 8 which is so configured that containers, such as the container 9 (FIGURE 2), presented to the guide will be automatically centered on the platforms 4 so that, upon upward movement of the platforms, the uper ends of the containers will be juxtaposed to the spouts 10 of the charging heads.

Figure 18:
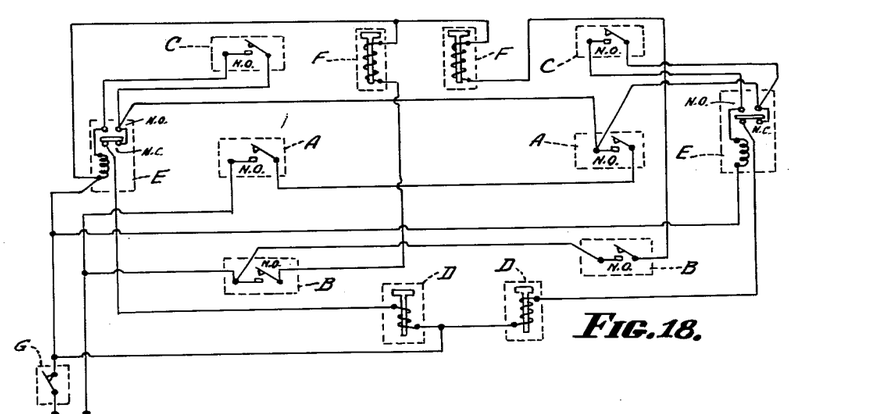
FIGURE 18 is a diagram illustrating a control circuit suitable for use with the two spout charging device of FIGURES 1 through 9.

As containers 9 are presented to the platforms 4 and aligned by guide 8, each container will contact an arm 11 secured to lever 12 pivoted at 13 for rocking movement in a clockwise direction, the levers 12 being normally biased in a counter clockwise direction by counter weights 14. As the arms 11 are contacted and moved by the containers, they close the switches A which, as seen in the wiring diagram of FIGURE 18, form a circuit through the normally closed contacts of relays E to solenoid actuated valves D, thereby opening the valves D and introducing air under pressure to the cylinders 5 which in turn lift the platforms 4 and juxtapose the upper ends of the containers 9 to the spouts 10 of the two charging heads. As the platforms move upwardly, they carry the arms 15 of switches B upwardly, thereby closing the switches and energizing solenoid valves F so as to introduce air under pressure into the actuating cylinders 16 of the charging heads, the air under pressure being introduced into the actuating cylinders through condiut 17 (FIGURE 2) connected to the source of compressed air. As will become apparent hereinafter, the actuating cylinders serve to force predetermined quantities of propellant gas into the containers being charged.

Figure 5:
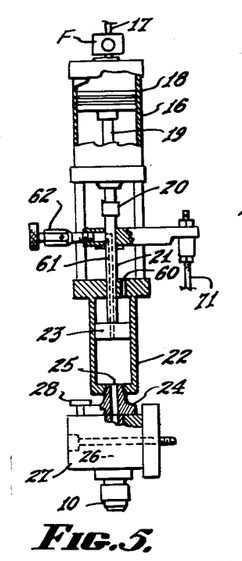
FIGURE 5 is a side elevational view with parts broken away and others in section illustrating the principal components of the charging head.
Figure 6:
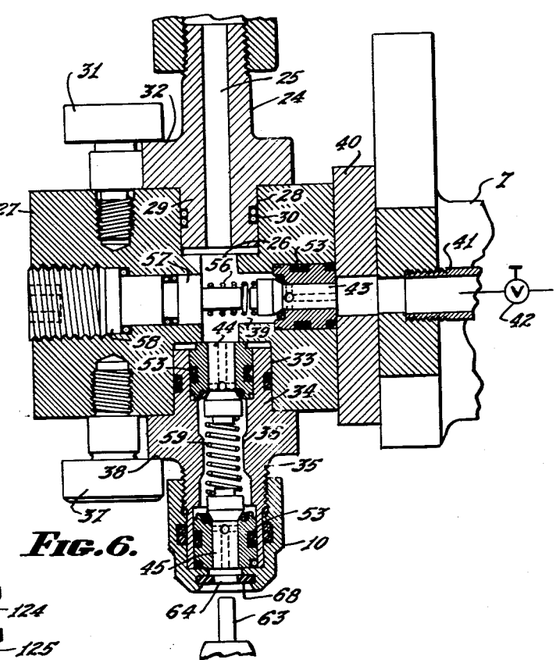
FIGURE 6 is an enlarged vertical sectional view of the spout portion of the charging head illustrating the valving mechanism.

Referring now to FIGURE 5, each of the actuating cylinders 16 is provided with a piston 18 having a piston rod 19 extending downwardly therefrom and operatively connected, as by a coupling 20, to the piston rod 21 of charging cylinder 22 having a piston 23. The charging cylinder is provided at its lower end with a fitting 24 having a passageway 25 through which the propellant gas enters the charging cylinder and is also exhausted therefrom. At its lower end, and as best seen in FIGURE 6, the passageway 25 communicates with a vertical bore 26 in valve block 27, the valve block having a cylindrical recess 28 which receives the head 29 of fitting 24. A sealing ring 30 provides a tight seal between the head 29 and the recess in the valve block; and the valve block is secured to fitting 24 by means of the thumb screw 31 which engages the shoulder 32 of the fitting.

On its underside the valve block 27 is provided with a recess 33 which receives the head 34 of a fitting 35 which mounts the spout 10 at its lower end. The fitting 34 has a vertical passageway 36 in communication with the vertical bore 26 in the valve block; and the fitting 34 is secured to the valve block by means of a thumb screw 37 which engages the shoulder 38 of the fitting, as will be clear from FIGURE 6 of the drawings.

Within the valve block a horizontal bore 39 extends between the vertical bore 26 and the rear face of the valve block where it communicates with a plate 40 through which the liquid propellant gas is delivered to the charging spout from a source of supply (not shown) through a conduit 41 and supply valve 42. The plate 40 and valve block 27 secured thereto may be conveniently secured to the mounting bracket 7 which, it will be remembered, is vertically slidable on the supporting column 1.

Figure 7:
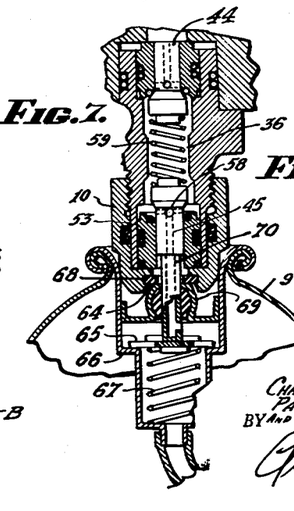
FIGURE 7 is a fragmentary vertical sectional view illustrating the lower portion of the filling spout with a container juxtaposed thereto.
Figure 8:
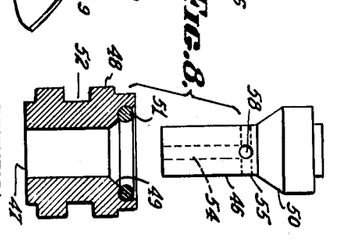
FIGURE 8 is an enlarged exploded view of a valve element and its coacting seat member.

The flow of the liquefied propellant gas within the charging head is controlled by a series of three normally closed spring-loaded valves 43, 44 and 45 which are of identical construction. The construction of these valves is illustrated in FIGURE 8 wherein it will be seen that each valve comprises a shank or plunger 46 adapted to be slidably received in bore 47 of a fitting 48 having an inclined shoulder 49 against which the enlarged head 50 of the plunger is adapted to seat. A sealing ring 51 provides a tight seal when the head 50 is seated against the shoulder 49. The fitting 48 is provided with an annular groove 52 which, as seen in FIGURES 6 and 7, receives sealing rings 53 by means of which the fittings are received in the enlarged ends of the passageway 36 or in the horizontal bore 39, as the case may be. Each of the plunger or shank portions 46 is provided with an axial passageway 54 terminating adjacent the head 50 in a plurality of radially extending passageways 55 which open outwardly at the surface of the plunger.

It is to be pointed out in connection with the valves 43, 44 and 45, that the arrangement and positioning of the sealing rings 51 relative to the radially disposed passageways 55 is important to the proper operation of valves. Generally speaking, sealing rings which are placed in the line of fluid flow—as if the propellant gas were permitted to flow directly through bore 47—will dislodge or wash the rings from their retaining grooves. In the construction employed herein, the stem or shank 46 extends through the ring 51 and the fluid flows through the axial passageway 54 and radial passageways 55, thereby in effect by-passing the sealing ring so that a "washing" action will not take place. In addition, the stem or shank 46 extends through the ring 51 at all times and consequently the ring is captive and cannot escape.

The valve 43 in horizontal bore 39 is normally biased to closed position by a compression spring 56 (FIGURE 6) which surrounds a stop or abutment 57 in bore 39 and is retained therein by plug means 58. Similarly, the valves 44 and 45 are biased to closed position by means of a spring 59 extending between the heads of the plungers of the two valves.

In the operation of the charging head, the liquefied propellant gas, which will be under pressure, will flow from conduit 41 into contact with the free end of the plunger of valve 43, thereby causing the plunger to be displaced axially against the force of spring 56. Displacement of the plunger will permit the gas to flow through the axial passageway in the plunger and escape through the then uncovered radial passageways 55, whereupon the liquefied gas will flow into horizontal bore 39 and thence upwardly through passageway 25 into the charging cylinder. The gas will not flow downwardly into passageway 36 by reason of normally closed valve 44 which is maintained in closed position by spring 59 which, as will be explained more fully hereinafter, is chosen to have a holding force in excess of the pressure of the incoming gas. As the gas flows into the charging cylinder 22, it will cause the piston 23 to rise within the cylinder, and the upward movement of the piston 23 will also cause the piston 18 of actuating cylinder 16 to rise. In this connection, the upper end of charging cylinder 22 will be vented, as by means of vent passageway 60 (FIGURE 5). Similarly, the upper end of the actuating cylinder 16 will be vented at the valve F which, when in closed position, will vent cylinder 16 to the outside air. A manual vent is also provided for the charging cylinder 22 in order to initially evacuate all of the air therefrom. To this end, the piston rod 21 is provided with a vent passageway 61 leading to a bleeder valve 62.

As already indicated, the elevation of lift platforms 4 causes switches B to close, thereby actuating solenoid valves F to introduce compressed air into the upper end of the actuating cylinders 16. The pistons 18 are thus caused to move downwardly in the actuating cylinders and this, in turn, drives the pistons 23 downwardly so as to force the charges of liquid propellant gas from charging cylinders 22. The charge of gas in each cylinder passes downwardly through passageway 25 and vertical bore 26 where it unseats valve 44 and flows into lower passageway 36. It will be understood that the pressure of the liquefied gas in bore 39 and the action of spring 56 will cause valve 43 in the horizontal intake passageway to close, thereby assuring that the full charge of gas will flow downwardly through valve 44.

As best seen in FIGURE 7, the presentation of the container 9 to the filling spout 10 causes the depressible valve element or valve stem 63 of the container to enter the orifice 64 in the filing spout 10 and press against the under surface of the plunger of valve 45. The compressive resistance of spring 59 bearing against the plunger is such that the plunger will not be displaced until the depressible valve stem is fully depressed to its open position, whereupon an abutment element 65, forming a part of the container valve stem, strikes a shoulder 66 formed within the container, the valve spring 67 of the container yielding under the greater resistance of spring 59. With the valve stem thus bottomed, further upward movement of the container results in the plunger of valve 45 being lifted upwardly so as to open the passageways therein to the flow of fluid from vertical passageway 36. A resilient gasket 68 in orifice 64 is arranged to provide sealing engagement with the portion 69 of the container valve, the gasket acting as a seal to obviate loss of the propellant gas around the valve stem of the container. The valve 44 is yieldingly retained in closed position until the charging action is initiated by the downward movement of piston 23, whereupon the pressure exerted against the uppermost end of the plunger of valve 44 causes it to open against the compression of spring 59, thereby permitting flow of the propellant through valve 44, passageway 36, valve 45, and into the valve stem passageway 70. Upon subsequent lowering of the container, its valve element will be instantly closed by the action of spring 67; and at the same time the plunger of valve 45 will be instantly closed by reason of the spring 59 which will cause the plunger to seat upon removal of the container valve stem.

Figures 1, 2, 3, 4:
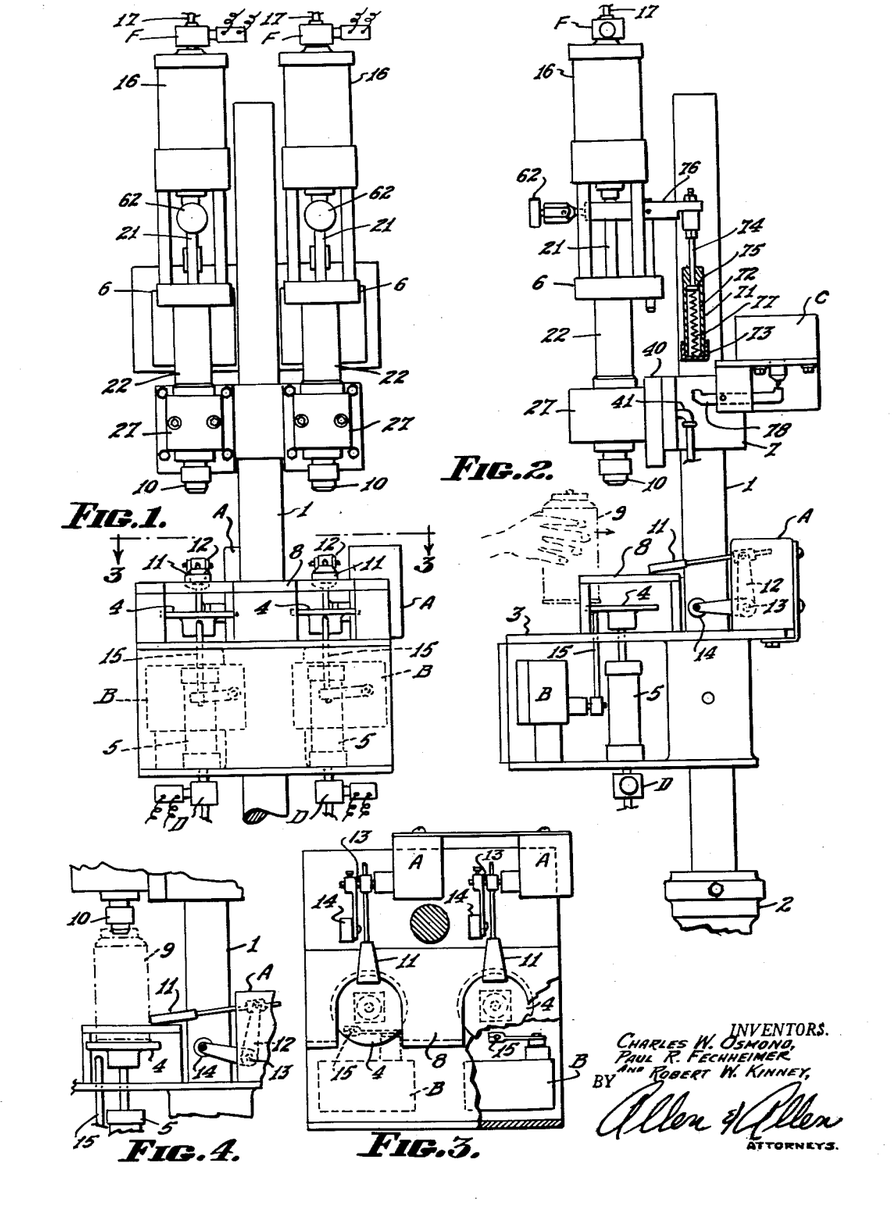
FIGURE 1 is a front elevational view of a basic two spout charging device in accordance with our invention.
FIGURE 2 is a side elevational view of the device illustrated in FIGURE 1.
FIGURE 3 is a sectional view taken along the line 3—3 of FIGURE 1.
FIGURE 4 is a fragmentary side elevational view showing a container in charging position.

Referring to FIGURE 2, as the pistons 23 of the charging cylinders approach a pre-selected quantity limit, which may be all or less than the full charge of the cylinders, switch actuating members 71 carried by each of the piston rods 21 contact and close limit switches C which through an electrical circuit energize relays E, thereby breaking the normally closed contacts forming part of the circuit energizing solenoid valves D. Valves D are thus deenergized, causing the platforms 4 to be lowered. At the same time the normally open contacts of the relay established a holding circuit through switches A which hold the relays open until the containers 9 have been removed from the platforms 4, at which time the limit switches A open to break the holding circuit and permit relays E to close. The lowering of the platforms 4 also serves to open switches B, which deenergize solenoid valves F, thereby permitting the pistons 18 to move upwardly in actuating cylinders 16 as propellant gas again flows into charging cylinders 22. Should the device malfunction, the entire cycle may be interrupted by means of a breaker switch G which, when opened, will deenergize solenoid valves D and F, thereby venting the actuating cylinders and moving the lift platforms to their lower position.

The switch actuating member 71 shown in FIGURE 2 comprises a tubular element 72 having a bottom cap 73, the tubular element being slidably arranged on a rod 74 having a head 75 and being affixed to the bracket 76. A preloaded compression spring 77 is contained in the tubular element 72 and the arrangement is such that as the actuating member moves downwardly with piston rod 21 to which it is mounted, it will contact lever arm 78 which serves to close switch C.

Figures 10, 11:
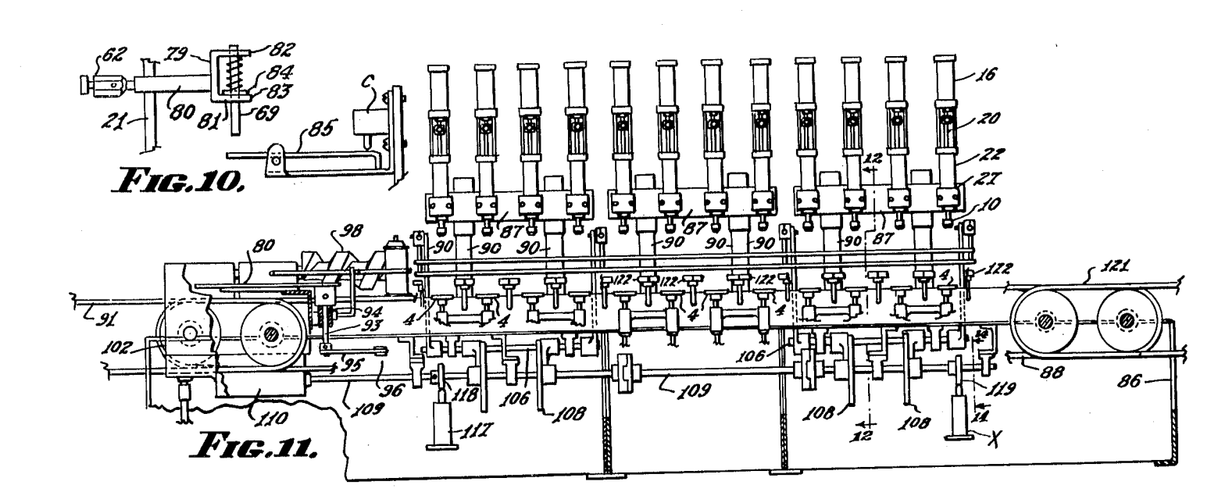
FIGURE 10 is an enlarged fragmentary view of a switch actuating means used in conjunction with the charging head.
FIGURE 11 is a side elevational view of a multiple head straight line charging machine.

Referring to FIGURE 10, we have therein illustrated an alternative mode of mounting the member 71 which serves to close limit switch C. In this instance the actuating member is in the form of a pin slidably received by a C-bracket 79 which may be conveniently secured to the extension 80. A spring 81 surrounds the pin and is confined between the arms 82 and 83 of the bracket. A stop 84 extending through the pin limits its downward movement relative to the bracket. As the pin is moved downwardly by the piston rod 21 as the charging cylinder is discharged, the lower end of the pin will contact one end of a lever 85 pivoted intermediate its ends, the lever in turn contacting and closing switch C. In both embodiments of the switch actuating means disclosed, the arrangement is such that contact of the member 71 with the switch actuating lever will not arrest continued downward movement of piston rod 21. Rather, should it be desired that the switch C be closed prior to the time the piston in the charging cylinder reaches the full extent of its stroke, the piston may nevertheless continue its downward movement, in which event the member 71 will move upwardly against the force of the spring member. In addition to permitting continued movement of the piston upon contact of member 71 with the lever arm by fulcruming the lever toward the end contacted by the pin, multiplication of movement is effected so that a slight movement of the actuating member will cause greater movement at the opposite end of the lever effective to positively close the switch.

While the charging device just described may be readily utilized singly or in pairs for a hand fed installation, the charging units may be readily arranged in straight-line groups for continuous operation. Thus, as seen in FIGURE 11, a plurality of the charging units may be mounted on a machine frame 86 by means of brackets 87 each adapted to mount a plurality of the charging heads. In the embodiment illustrated, four such heads are mounted on each bracket; and it will be apparent that as many brackets as required may be arranged side by side. Similarly, the number of units mounted on each bracket may be varied as desired. The units are arranged to overlie a plurality of lift platforms 4 mounted on the machine frame 86, the lift platforms being disposed between a pair of belt conveyors 88 and 89 the upper flights of which are substantially planar with the lift platforms when the platforms are in their lowermost positions. In this connection, the brackets 87 mounting the charging heads may be conveniently suspended over the lift platform by means of curved arms 90 also mounted on the machine frame to one side of the conveyors.

Figure 15:
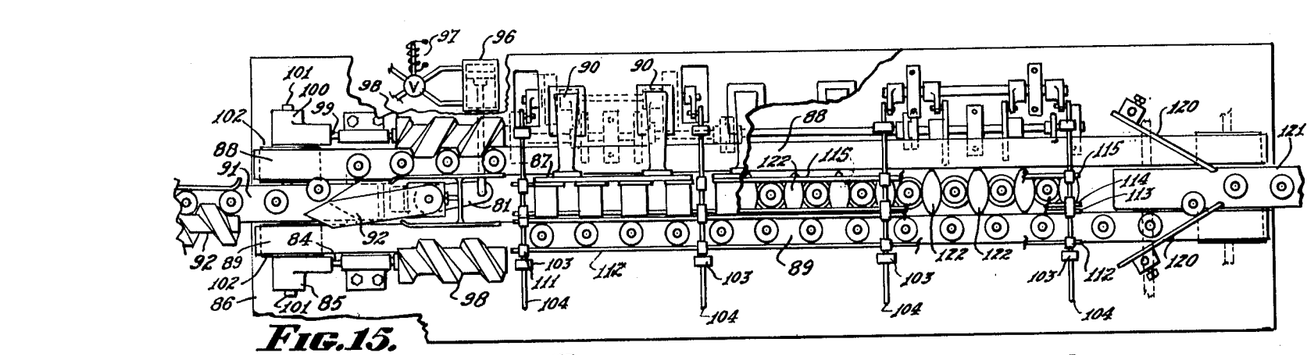
FIGURE 15 is a plan view of the device shown in FIGURE 11 with certain of the parts broken away for clarity of illustration.

At the leading end of the machine, a delivery conveyor 91 is arranged to pass between the conveyors 88 and 89, whereby containers to be charged may be delivered to the charging device. It will be understood that the containers to be charged may be picked up by the delivery conveyor from a preceding machine section, such as a container filling and capping device. As the containers are moved along on the delivery conveyor, they may be acted upon by a feed screw mechanism 92 which will serve to arrange the containers in spaced apart condition. As the containers approach the end of delivery conveyor 91, they will be contacted by a pivoted guide finger 92 arranged to selectively deflect the containers either to the conveyor 88 or the conveyor 89. To this end, and as best seen in FIGURES 11 and 15, the guide finger 92 may be mounted on a rock shaft 93 journaled in a bracket 94, the rock shaft in turn carrying an arm 95 operatively connected to a reversible air cylinder 96 to which air is supplied through a solenoid actuated valve 97. With this arrangement, a predetermined number of containers may be directed onto conveyor 88 whereupon the guide finger will be shifted to its alternate position of use, whereupon the succeeding containers will be directed in the opposite direction and onto the conveyor 89.

As the containers are directed onto the conveyors 88 and 89 they are contacted by feed screw mechanisms 98 by means of which the containers are accurately aligned upon the conveyors in spaced apart relation such that the containers will be spaced apart by a distance substantially equal to the distance between the spouts of adjacent charging heads. Preferably, the feed screw mechanism 98 will be mounted on shafts 99 which are adapted, through suitable gear mechanism 100, to be driven from shaft 101 which mounts sheaves 102 for the endless belt conveyors 88 and 89, thereby operating the feed screw mechanism in synchronism with the movement of the belt conveyors.

Figures 12, 14:
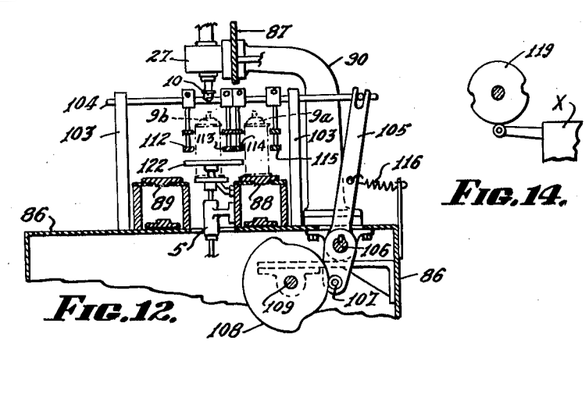
FIGURE 12 is a sectional view taken along the line 12—12 of FIGURE 11.
FIGURE 14 is a sectional view taken along the line 14—14 of FIGURE 11.
Figure 13:
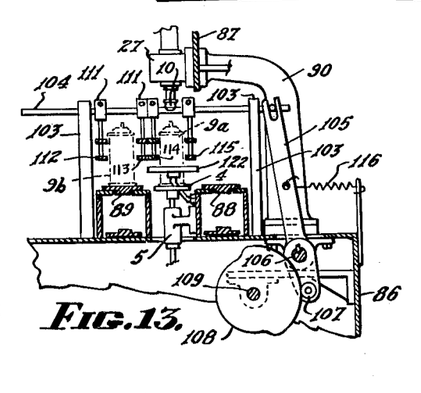
FIGURE 13 is a sectional view similar to FIGURE 12 but showing the parts in an alternate position of use.

A series of spaced apart posts 103 project upwardly from the machine frame, the posts being arranged in aligned pairs lying on opposite sides of the conveyors 88 and 89, as can be best seen in FIGURES 12 and 13. An axially slidable rod 104 extends between each pair of posts, each of the rods being connected at one end to a rock arm 105. Adjacent pairs of the rock arms 105 are connected at their lower ends to rock shafts 106 (FIGURE 11) which mount cam followers 107 (FIGURES 12 and 13) adapted to contact and follow the surfaces of the contoured rotatable cams 108 which are mounted on the jointed driven shaft 109. The shaft 109 is operatively connected through suitable gear means 110 (FIGURE 11) for movement in synchronism with the driving means for the conveyors 88, 89 and 91 so that all operating components of the machine will operate in timed relation.

Each of the rods 104 mounts a plurality of adjustable hangers 111 which support pairs of vertically spaced apart longitudinally extending guide rails 112, 113 and 114, 115, the sets of guide rails 112, 113 and 114, 115 defining between them channels having a width just slightly in excess of the cross sectional dimensions of the containers being handled by the device. The hangers are adjustable on the rods 111 so that the width of the channels may be varied to accommodate containers of various sizes.

As can be best seen by comparing FIGURES 12 and 13, the sets of guide rails are so arranged that when the rails 112, 113 overlie the lift platforms 4, the adjacent set 114 and 115 will overlie the conveyor 88. In their alternate position of use, as seen in FIGURE 13, the set 112, 113 will have shifted so as to overlie the conveyor 89, whereas the set 114, 115 will have shifted to overlie the lift platforms. The shifting of the guide rails from one position to another is effected through the lever arms 105 which are caused to pivot on the rock shafts 106 as the cam follower 107 follows the contoured surfaces of rotating cams 108, springs 116 being arranged as shown to maintain the cam followers in contact with the surfaces of the cams 108.

In the operation of the device, the containers delivered by the delivery conveyor 91 will be diverted by the pivoted guide finger 92 to one or the other of the conveyors 88 or 89 until a predetermined number of containers have been positioned on such conveyor, whereupon the pivoted guide finger will be moved to its alternate position, thereby diverting a predetermined number of containers to the other of the conveyor belts. The actuation of solenoid valve 97 moves the guide finger, its movement being controlled by a switch 117 (FIGURE 11) arranged to be opened and closed by a cam element 118 mounted on shaft 109, the cam element acting in timed relation to the speed of the incoming containers.

Figure 16:
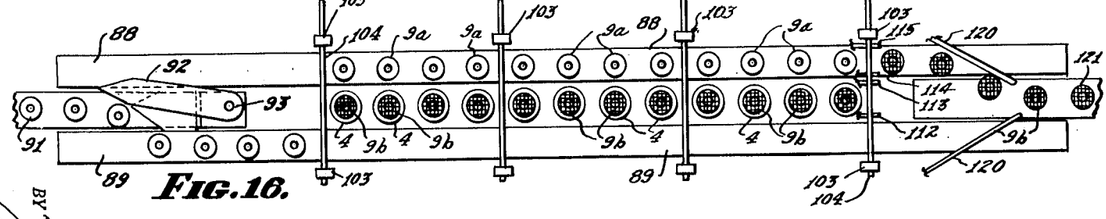
FIGURES 16 and 17 are diagrammatic plan views illustrating the operating sequence of the device.
Figure 17:
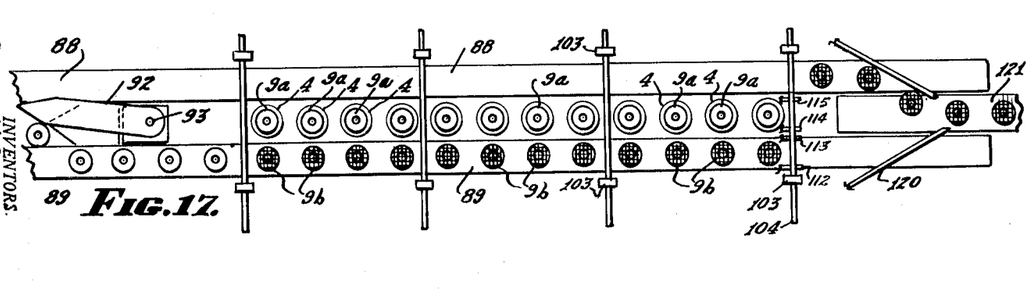

FIGURES 16 and 17 diagrammatically illustrate the operation of the container shifting and handling mechanism just described. In these figures cross-hatching has been employed to indicate those containers which have received their full charge and are to be transferred from the machine. Thus in FIGURE 16, a series of charged containers 9b are positioned on the lift platforms 4. Assuming that a charging operation has just been completed and that these containers have received their full charge of propellant gas, the arrangement is such that an uncharged series of containers, indicated at 9a, will have been advanced into position alongside the platforms 4 by the conveyor 88. The containers 9a will have arrived in the position shown just as the charging of containers 9b is completed, and the cams 108 (FIGURE 12) acting on the cam followers 107 will cause the levers 105, rods 104, and the set of guides attached thereto to be shifted to the position of FIGURE 13. Thus the charged containers 9b will be bodily moved from the platforms 4 to the conveyor 89 (FIGURE 17) and the series of uncharged containers 9a will be bodily moved from the conveyor 88 to the platforms 4. Upon positioning of the containers 9a on the platforms, a cam 119 (FIGURE 11) actuates limit switch X to initiate the next charging operation in a manner which will be more fully explained hereinafter. Thus the containers 9a will be subjected to a charging operation at the conclusion of which the cams 108 will again function to shift the sets of guide rods, this time from the position of FIGURE 17 to the position of FIGURE 16, thereby delivering the charged containers 9a to the conveyor 88. Upon the return of the charged containers to either of the conveyors 88 or 89, the containers will be advanced by the conveyors into contact with divergent guide members 120 which act to transfer the containers to a single outgoing or exit conveyor 121. It will be evident that as the continuously moving conveyors 88 and 89 advance the charged containers to the exit conveyor 121, the guide finger 91 will be diverting an uncharged series of containers onto the conveyor.

To assist in movement of the containers, to and from the platforms 4, additional guide members 122 (FIGURES 13 and 15) are positioned between the lift platforms, these guide members coacting with the shifting guide rods to center the containers on the lift platforms.

Figure 19:
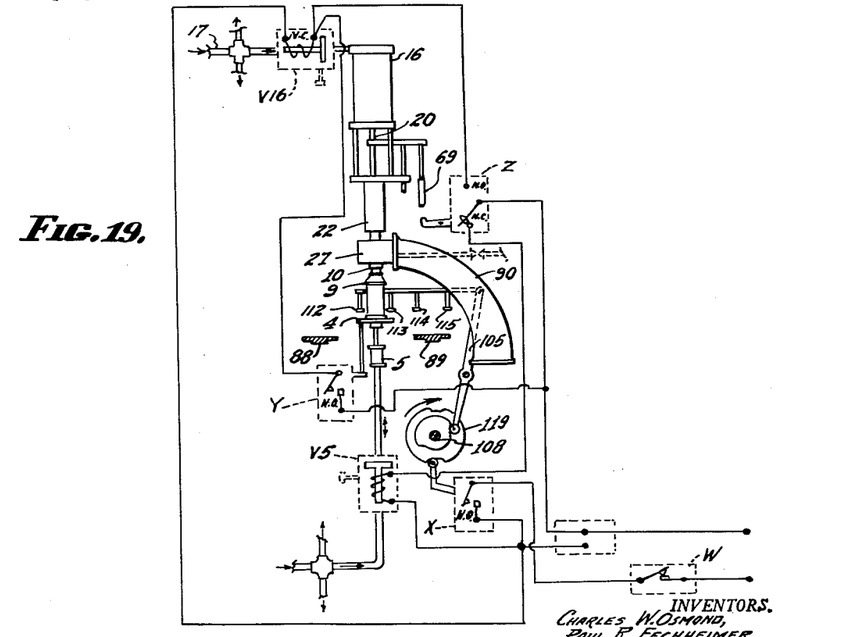
FIGURE 19 is a diagram illustrating a control circuit suitable for use with the multiple spout machine of FIGURES 11 through 17.

Referring now to the diagram of FIGURE 19, as the cams 108 actuate the shifting guide bars 112, 113, 114 and 115 to move a series of containers from conveyor 89 to the lifting platforms, limit switch "X" is in its normally open position and the circuit to the charging heads is open. As the cam 119 continues to rotate, it closes the switch X—at which time the containers will have been seated on the lifting platforms—and the switch completes a circuit to valves V5 which act to supply air under pressure to the cylinders 5 which raise the lift platforms and hence juxtapose the containers to the charging heads. As the lift platforms arrive at their fully elevated position, the switches Y are closed, thereby completing a circuit to valve V16 which opens to introduce air into actuating cylinders 16, whereupon the pistons in the cylinders move downward to discharge the contents of charging cylinders 22 in the manner already explained.

As the contents of each charging cylinder is transferred to the container, the pre-set actuating members 71 act to move switches Z to their alternate poles, in which position the following operations take place:

(a) The circuit to valve V5 is broken and the valve returns to its normally closed position in which the air is vented from the lifting cylinders, thus lowering the lift platforms and the containers thereon. The lowering of the containers, it will be remembered, permits valves 45 in the charging heads to close, and at the same time the valve elements in the containers close. The lowering of the platforms also cause the switches Y to return to their normally open position.

(b) The new position of switches Z also forms a circuit to hold valves V16 open, thereby maintaining the air pressure in the actuating cylinders and hence holding the pistons of the charging cylinders in their lower positions. This serves to maintain the members 69 in contact with the switches Z and effects a holding circuit to the valves V16 until the cam 119, as it continues to rotate, causes switch X to open, thereby breaking the holding circuit and closing valves V16 which act to vent the actuating cylinders, thereby releasing the pistons in the charging cylinders for upward movement under the influence of the propellant gas seeking to enter the cylinders.

If a container fills too slowly or will not accept the charge, or if no container is present on a lifting platform, the switch Z for the charging head involved will not be actuated since the piston in the charging cylinder will not have moved downwardly a sufficient distance to contact the lever arm for the switch. However, the lift platform will be automatically lowered by the action of cam 104 which opens switch X and breaks the circuit to valves V5 and V16, thereby causing the cylinders 5 and 16 to exhaust so that the lift platform will lower and the charging cylinder may accept a renewed charge of propellant gas for the next container.

The straight line filling device just described has been found to be highly advantageous in that any number of charging units can be added to increase the machine capacity, the increase in capacity adding only to the length of the machine. Since the machine is of considerably less depth than a conventional rotary filling device, the line width and area is considerably reduced, which is a decided advantage in many manufacturing plants where space is at a premium. In addition, the straight line machine permits adjustment of fill contents while the machine is operating and the individual charging units may be replaced while the machine is in operation. This has been found to greatly reduce the "down" time of the machine. The straight line operation also makes the pickoff of containers extremely easy for checking purposes without having to slow down or otherwise interrupt the normal filling operation.

While the container shifting mechanism as herein described has been disclosed in conjunction with containers to be presented to the charging heads, it should be apparent that the mechanism will find utility in other machine applications wherein it is desired to simultaneously shift a plurality of containers or other articles from a conveyor to an operating station positioned adjacent the conveyors.

Modifications may, of course, be made in our invention without departing from the spirit of it. For example, in FIGURE 9 we have illustrated a modified form of lift platform adapted to compensate for possible variations in the heighth of the containers being filled. As seen therein, the platform 4 is provided with a depressible platform member 123 mounted on a plurality of posts 124, the lower ends of which pass through openings in the platform 4 and are retained by nuts 125. Compression springs 126 surround the posts 124 and resiliently bias the platform member 123 to its uppermost position. It will be evident that a container placed on platform 123 may be readily accommodated to the filling spout of a charging head irrespective of any minor variation in the overall height of the container.

Figure 9:
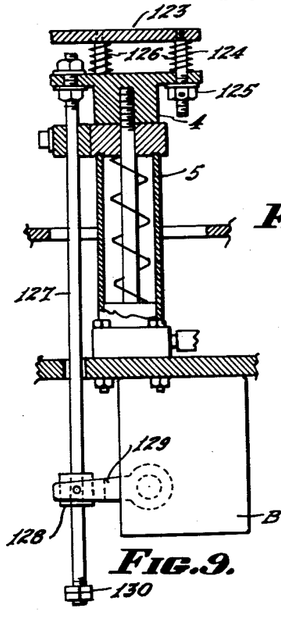
FIGURE 9 is a fragmentary vertical veiw, partly in section and illustrating a preferred arrangement of parts for lifting a container to charging position.

With the arrangement of FIGURE 9, the switch B may be conveniently actuated by means of a rod 127 secured at its upper end to the platform and journaled at its lower end in a bearing 128 carried by the switch arm 129. As the platform 4 is moved upwardly, a stop 130 on the lower end of the rod 127 will contact and actuate the arm 129 as the platform reaches its uppermost position.

Referring now to FIGURES 20-23 of the drawings, we have therein illustrated a modified form of container shifting means wherein the outermost guide rails 112 and 15 are mounted for movement independently of the intermediate guide rails 113 and 114. This arrangement is of particular utility wherein the conveyors 88 and 89 are operating at relatively high speeds and there is a tendency of the leading incoming container, such as the container 9c (FIGURE 20), to strike the outermost guide rail, such as the rail 112, as the guide rails are shifted from their position over the lift platforms to their position overlying one or the other of the conveyors.

Figure 21:
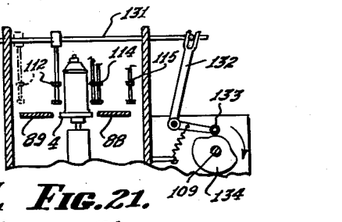
FIGURE 21 is a vertical sectional view taken along the line 21—21 of FIGURE 20.
Figure 22:
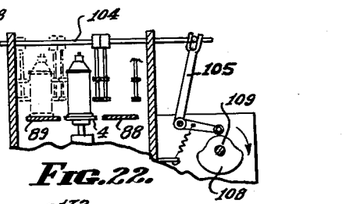
FIGURE 22 is a vertical sectional view taken along the line 22—22 of FIGURE 21.
Figure 23:
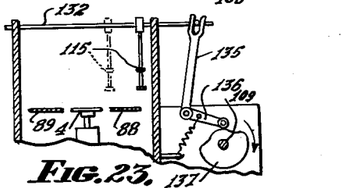
FIGURE 23 is a vertical sectional view taken along the line 23—23 of FIGURE 20.

In order to provide for independent movement of the outermost guide rails, these rails are mounted on shift rods 131 and 132, respectively, each of which is independent of the shift rods 104 mounting the intermediate guide rails 113 and 114. Thus, as seen in FIGURE 21, the shift rod 131 carrying guide rails 112 is provided with an actuating arm 132 having a cam follower 133 arranged to contact a cam 134 secured to shaft 109 which, it will be remembered, is the shaft which rotates the cam 108 acting through arm 105 to shift the rod 104. Similarly, as seen in FIGURE 23, an arm 135 having a cam follower 136 is secured to shift rod 132, the arm being actuated by a cam 137 also mounted on shaft 109. As will be apparent by comparing FIGURES 21, 22 and 23, the cams 134, 108 and 137 are of different configuration and their relationship to each other is such that cams 134 and 108 will act simultaneously to shift containers from conveyor 89 to the lift platforms 4. However, immediately upon positioning of the containers on the lift platforms, the cam 133 will act to move outer rail 112 outwardly to its original position (as shown in dotted lines in FIGURE 21) thereby effectively clearing it from the path if the oncoming cams. Of course, when the charging of the containers on the platforms is completed, cam 108 will act to shift the containers outwardly onto conveyor 89 as in the earlier embodiment.

It will be understood that as the intermediate guide rails 113 and 114 shift so as to move the containers from the platforms to the conveyor 89, the guide rail 115 will simultaneously shift inwardly thereby moving containers from conveyor 88 onto the lift platform, whereupon the cam 137 (FIGURE 23) will act to return the guide rail 115 and its outermost position, i.e., from the position illustrated in dotted lines in FIGURE 23 to the position illustrated in solid lines, this action occurring while the containers delivered to the lift platforms are being charged.

Figures 20, 28:
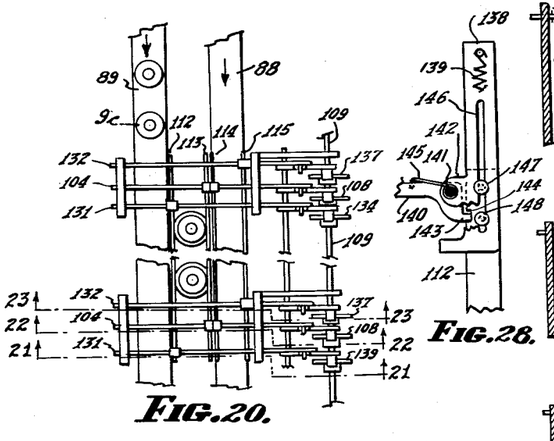
FIGURE 20 is a fragmentary plan view of an alternate form of container shifting means wherein the outermost guide rails are movable independently of the intermediate rails.
FIGURE 28 is an enlarged fragmentary plan view showing details of the axially slidable end of the outermost guide rails.

FIGURES 24-28 illustrate yet another modification of the guide rails wherein, instead of providing for independent movement of the outermost guide rails, these rails are provided with axially slidable end portions which, when retracted, will effectively remove their leading ends from the path of an oncoming container. To this end, the leading ends of the guide rails 112 and 115 are provided with retractable sections 138 which are adapted to telescope relative to the remainder of the rails. The sections 138 are under the influence of springs 139 which act to bias the sections toward their innermost or retracted position. The sections are, however, locked in their outermost position by arms 140 which, as best seen in FIGURE 28, are pivoted at 141 to ears 142 carried by the sections, the arms having nose portions 143 engageable in notches 144 in the guide rails. Spring elements 145 act to bias the arms 140 to the rail engaging position. Preferably, the sections 138 will be provided with elongated slots 146 slidable relative to spaced-apart pins 147 and 148 which serve to maintain the sections in alignment during movement.

Figure 24:
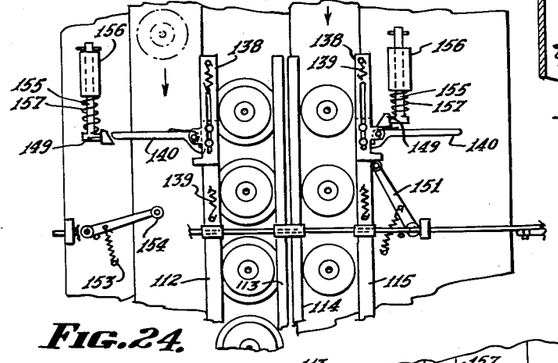
FIGURE 24 is a fragmentary plan view of yet another form of container shifting guide rails.
Figure 25:
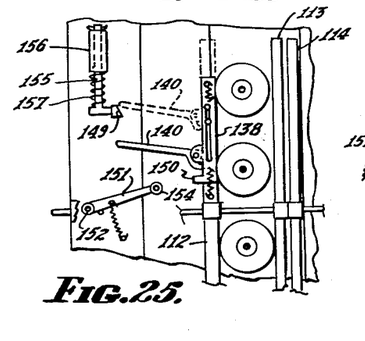
FIGURES 25, 26 and 27 are fragmentary plan views similar to FIGURE 24 illustrating successive positions of the outermost guide rail during its outward movement.
Figure 26:
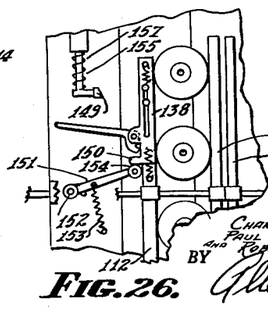
Figure 27:
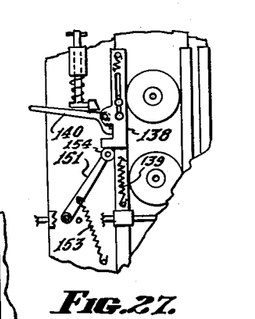

As best seen in FIGURE 24, as the rail 112 is moved outwardly, the outermost end of arm 140 will contact an abutment 149 having an inclined face which will pivot the arm 140 so as to release the nose 143 from notch 144, thereby releasing the section 138 for retracting movement under the influence of the spring 139, the section thus moving to the position illustrated in FIGURE 25. It will be noted that as this action occurs, the entire guide rail will be moving outwardly. However, in its outward movement, the leading end of the rail 112 will be displaced from the position illustrated in dotted lines in FIGURE 25 to the position illustrated in solid lines. As the rail continues its outward movement, a projecting foot 150 at the innermost end of the section will contact the outer end of a finger 151 pivotally mounted at its opposite end, at 152, to the machine frame. A spring 153 normally biases the finger 151 to the foot contacting position, as best seen in FIGURE 26. Preferably, the free end of the finger 151 will carry a roller 154 for contact with the foot. As the outward movement of the guide rail continues, the finger 151 will be caused to pivot against the tension of its spring, in the manner best seen in FIGURE 27, and this movement will have the effect of moving the retracted section 138 outwardly against the compression of spring 139. When the guide rail has reached its outermost position, the finger 151 will have moved the section 138 outwardly to its fully extended position, whereupon the nose of the arm 140 will become aligned with the notch 148 in the guide rail and the spring 145 will urge the nose into the notch, thereby locking the section in the extended position. It will be understood that the section will remain in the extended position upon inward movement of the guide rail.

It is also contemplated that the abutment 149 be mounted on an axially movable rod 155 slidable in bracket 156 the rod being normally biased to its outmost position by spring 157. The purpose of this arrangement is to permit the abutment and rod to move axially upon contact by the arm 140 when the guide rail reaches its outermost position and the parts are in the relationship shown in FIGURE 27. It will be understood, of course, that identical mechanism will be employed on the opposite side of the device at the leading end of outermost guide rail 115.

While we have already disclosed several embodiments and modifications of our invention, additional modifications may also be made without departing from the spirit of our invention and we do not intend to be limited excepting in the manner set forth in the claims which follow.

Having this described our invention in several exemplary embodiments, what we desire to secure and protect by Letters Patent is:

1. In a multiple station charging device, a series of charging heads arranged in a row, a conveyor extending lengthwise of said row on at least one side thereof, means for feeding containers to said conveyor in predetermined quantities equal to the number of charging heads in said row, means for spacing apart said containers so that, as the predetermined number of containers are delivered to said conveyor, they will be spaced apart by a distance substantially equal to the distance between adjacent charging heads in said row, container lifting means underlying each of said charging heads, and container shifting means operative upon movement of a quantity of containers into alignment with said lifting means, to bodily shift said quantity of containers from said conveyor to said lifting means, means operative upon placement of said quantity of containers on said lifting means to actuate said lifting means and present the containers thereon to said charging heads, means acting upon the charging of said containers to lower said lifting means, and means for moving said shifting means to return said quantity of containers from said lifting means to said conveyor.

2. In a multiple station container charging device, a plurality of charging heads arranged in a row, a lift platform underlying each of said charging heads, a first conveyor extending lengthwise of said row of charging heads on one side thereof, a second conveyor extending lengthwise of said row of charging heads on the opposite side thereof, container feeding means for selectively delivering predetermined quantities of containers from said feeding means to each of said conveyors, container shifting means overlying said lift platforms and alternately operable to bodily shift the containers from one of said conveyors to said lift platforms while at the same time shifting containers from said lift platforms to the other of said conveyors.

3. The device claimed in claim 2 wherein said container shifting means comprises spaced apart pairs of guide rails arranged to define a pair of side-by-side channels each of a width slightly in excess of the cross-sectional dimensions of the containers being handled, said pairs of channels being laterally shiftable so that in one position of use a first pair of said channels will overlie said first conveyor with the second pair of said channels overlying said lift platforms, and in the other position of use the said first pair of channels overlies said lift platforms and said second pair of channels overlies said second conveyor.

4. The device claimed in claim 3, wherein said container feeding means comprises a third conveyor extending between said first and second conveyors, and wherein said means for delivering quantities of containers to each of said first and second conveyors comprises a guide finger shiftable in timed relation to the movement of said first and second conveyors.

5. The device claimed in claim 4 wherein each of said charging heads includes a charging cylinder and an actuating cylinder operatively connected to said charging cylinder and adapted upon actuation, to discharge contents from said charging cylinder into a container presented to said charging head, and means operative upon the shifting of said container shifting means to actuate said lift platforms and said actuating cylinders.

6. The device claimeed in claim 5 including spacing means in conjunction with said first and second conveyors, said spacing means acting to space apart adjacent containers delivered to said conveyors by a distance substantially equal to the distance between adjacent charging heads.

7. The device claimed in claim 5 including a drive shaft for driving said three conveyors in timed relation, and cam means responsive to the rotation of said drive shaft for actuating said guide finger, said shifting means, and said lift platforms.

8. Shifting means for use in a device wherein a plurality of articles are to be shifted from a conveyor to an operating station having a plurality of spaced apart article receiving platforms and subsequently returned to the conveyor, a continuously moving conveyor extending lengthwise of the operating station on one side thereof, means for feeding articles to said conveyor in spaced apart relation, the distance between said article being substantially equal to the distance between adjacent article receiving platforms, article shifting means overlying said conveyor, said article shifting means comprising a spaced apart pair of guide rails defining a channel extending lengthwise of said conveyor through which the articles are passed while being moved by said conveyor, means acting in timed relation to the speed of travel of said conveyor for laterally shifting said guide rails to overlie said operating station, whereby to bodily shift a plurality of articles from said conveyor to said operating station simultaneously and deposit the articles on the said platforms.

9. In a device for bodily shifting a plurality of articles from either of two conveyors located on opposite sides of a station, a spaced apart pair of conveyors traveling in the same direction, an article receiving means located between said conveyors, means for alternately feeding groups of articles to each of said conveyors, and article shifting means operable between said conveyors and said article receiving means to alternately shift articles from one of said conveyors to said article receiving means while at the same time shifting articles from said article receiving means to the other of said conveyors.

10. The device claimed in claim 9 wherein said article shifting means comprises spaced apart pairs of guide rails arranged to define a pair of side-by-side channels of a width to receive the articles being conveyed, said pairs of channels being laterally shiftable so that in one position of use a first pair of said channels will overlie one of said conveyors with the second pair of said channels overlying the article receiving station, and in the other position of use the said first pair of channels overlies the article receiving station and said second pair of channels overlies the other of said conveyors.

11. The device claimed in claim 10 wherein the outermost guide rail in each pair is movable independently of the remaining guide rails, and means for concurrently shifting the guide rails in each pair from a position overlying a conveyor to a position overlying the article receiving station and for shifting the outermost rail in each pair to the conveyor position prior to the shifting of the remaining guide rails to such position.

12. The device claimed in claim 10 wherein the outermost guide rail in each pair has an axially slidable section at its leading end, and means for retracting said slidable section upon movement of said outermost guide rails from a position overlying said article receiving station to a position overlying one of the said conveyors.

13. The device claimed in claim 12 including spring means normally biasing said axially slidable section to its innermost position, means operative upon movement of said outermost guide rails to a position overlying the conveyors effective to extend said sections against the tension of said spring means, and latch means for securing said sections in their extend position.

14. The device claimed in claim 13 including latch release means operative to release said sections for axial movement upon the initiation of the shifting movement of said guide rails to overlie said conveyors.

15. A container charging device comprising a charging head having a charging cylinder and a discharge spout, a passageway extending between said charging cylinder and said discharge spout, and a branch passageway opening into said first named passageway intermediate said charging cylinder and said discharge spout, said branch passageway being adapted to be connected to a source of charging fluid under pressure, a piston in said charging cylinder movable from a cylinder filling position to a predetermined cylinder discharging position, an actuating cylinder operatively connected to the piston of said charging cylinder, a first valve element in said branch passageway for introducing charging fluid under pressure into said charging cylinder, said first valve element comprising a check valve oriented to be opened by the pressure of the charging fluid seeking to flow through said branch passageway into said charging cylinder, a control valve for introducing fluid under pressure into said actuating cylinder, a second valve element in said discharge spout oriented to be opened upon contact by a container presented to said discharge spout, a third valve element in said first named passageway lying between said branch passageway and said second valve element, said third valve element being spring biased to closed position and adapted to be opened under a fluid pressure greater than the pressure of the charging fluid entering said charging cylinder through said first named valve element, said three valve elements being of identical construction, each comprising a plunger slidably received in the bore of a fitting having an inclined annular shoulder, a gasket on said annular shoulder, said plunger having an enlarged head adapted to seat against said gasket and an axial passageway extending from the end of the plunger opposite said head and terminating adjacent said head in a plurality of radially extending passageways opening outwardly at the outer surface of said plunger immediately beneath the head portion thereof, so that when said head is unseated, charging fluid flowing through said axial passageway and said radial passageways will effectively by-pass said gasket and prevent it from being displaced, and means operative upon the presentation of a container to said discharge spout to open said control valve, whereby to introduce fluid under pressure into said actuating cylinder, said actuating cylinder acting to move the piston in said charging cylinder from the cylinder filling to the cylinder discharging position, thereby discharging a portion at least of the fluid in said charging cylinder through said second and third valve elements and into the container presented to said discharge spout.

16. A container charging device comprising a charging head having a charging cylinder and a discharge spout in communication therewith, a fluid operated actuating cylinder operatively connected to said charging cylinder, valve means in said head for introducing charging fluid under pressure into said charging cylinder, platform lifting means for presenting a container to be charged to said discharge spout, said platform lifting means being movable from an inoperative to an operative position, means operative upon the presentation of a container to said platform lifting means to move said lifting means from the inoperative to the operative position, container actuated valve means in said discharge spout arranged to be opened by a container presented to said spout, said container actuated valve means being positioned to be contacted by a depressible valve stem forming a part of the container, said container actuated valve means including spring means effective to depress the container valve stem prior to the opening of said valve means to the flow of charging fluid therethrough, means operative upon movement of said platform lifting means to operative position to supply fluid under pressure to said actuating cylinder, said actuating cylinder acting to eject a portion at least of charging fluid from said charging cylinder and inject the same into the container presented to said discharge spout, and means operative upon the ejection of the fluid from said charging cylinder to move said platform lifting means from operative to inoperative position.

17. In a container charging device, a charging head having a discharge spout and a storage cylinder for charging fluid in communication therewith, a conduit for delivering charging fluid under pressure from a source of supply to said storage cylinder, a first valve means oriented as a normally closed check valve arranged to open under the pressure of the charging fluid in said conduit to fill said storage cylinder, a second valve means oriented to normally prevent out-flow of charging fluid through said discharge spout, said second valve means being positioned to be contacted and opened by a container presented to said discharge spout, a third valve means intermediate said second valve means and said storage cylinder, said third valve means being oriented to oppose the pressure of the charging fluid in said storage cylinder and remain normally closed, means for evacuating said charging cylinder by exerting pressure on the fluid therein, said third valve means being spring loaded and displaceable independently of said second valve means under the added pressure imparted to said charging fluid by said evacuating means, whereby to introduce said charging fluid into a container presented to said discharge spout.

18. The container charging device claimed in claim 17 wherein said second and third valve means each comprise a plunger slidably received in the bore of a fitting having an inclined annular shoulder, a gasket on said annular shoulder, said plunger having an enlarged head adapted to seat against said gasket, an axial passageway in said plunger extending from the end thereof opposite said head and terminating adjacent said head in a plurality of radially extending passageways opening outwardly at the outer surface of said plunger immediately beneath the head portion thereof, whereby, when said head is unseated, fluid flowing through said axial passageway and said radial passageways will effectively by-pass said gasket and prevent it from being displaced.

19. In a container charging device having a charging head including a passageway through which charging fluid under pressure is introduced into a container being charged, valve means for opening and closing said passageway to the flow of charging fluid therethrough, said valve means comprising a plunger slidably received in the bore of a fitting having an inclined annular shoulder, a gasket on said annular shoulder, said plunger having an enlarged head adapted to seat against gasket, an axial passageway extending through said plunger from the end thereof opposite said head and terminating adjacent said head in a plurality of radially extending passageways opening outwardly at the outer surface of said plunger immediately beneath the head portion thereof, whereby, when said head is unseated, fluid flowing through said axial passageway and said radial passageways will effectively by-pass said gasket and prevent it from being displaced by said fluid.

References Cited in the file of this patent

UNITED STATES PATENTS

| | | |
|---|---|---|
| 744,048 | Cerruti | Nov. 17, 1903 |
| 1,416,345 | Gosselin | May 16, 1922 |
| 1,418,203 | Pennock | May 30, 1922 |
| 1,442,405 | Hawthorne | Jan. 16, 1923 |
| 2,082,567 | Bleam | June 1, 1937 |
| 2,376,838 | Walter | May 22, 1945 |
| 2,594,492 | Pfeiffer et al. | Apr. 29, 1952 |
| 2,605,948 | Bridge | Aug. 5, 1952 |
| 2,613,023 | Reich | Oct. 7, 1952 |
| 2,661,885 | McBean | Dec. 8, 1953 |
| 2,689,075 | Morton et al. | Sept. 14, 1954 |
| 2,695,123 | Suellentrop | Nov. 23, 1954 |
| 2,841,840 | Reichert | July 8, 1958 |
| 2,857,937 | Ayres | Oct. 28, 1958 |

FOREIGN PATENTS

| | | |
|---|---|---|
| 802,224 | Great Britain | Apr. 2, 1957 |